United States Patent
Al Saiari et al.

(10) Patent No.: US 12,427,516 B2
(45) Date of Patent: Sep. 30, 2025

(54) APPARATUS FOR FORMING AND TESTING INORGANIC SALTS

(71) Applicant: Saudi Arabian Oil Company, Dhahran (SA)

(72) Inventors: Hamad Al Saiari, Al-Khobar (SA); Christian Canto Maya, Dhahran (SA); Hassan Alshahdood, Jubail (SA)

(73) Assignee: Saudi Arabian Oil Company, Dhahran (SA)

( * ) Notice: Subject to any disclaimer, the term of this patent is extended or adjusted under 35 U.S.C. 154(b) by 222 days.

(21) Appl. No.: 17/859,343

(22) Filed: Jul. 7, 2022

(65) Prior Publication Data

US 2024/0009661 A1    Jan. 11, 2024

(51) Int. Cl.
| | |
|---|---|
| B01L 3/00 | (2006.01) |
| G01N 1/14 | (2006.01) |
| G01N 1/38 | (2006.01) |
| G01N 1/44 | (2006.01) |
| G01N 23/20 | (2018.01) |

(52) U.S. Cl.
CPC ............ B01L 3/502 (2013.01); G01N 1/14 (2013.01); G01N 1/38 (2013.01); G01N 1/44 (2013.01); G01N 23/20 (2013.01); B01L 2200/026 (2013.01); B01L 2200/10 (2013.01); B01L 2200/16 (2013.01); B01L 2300/0681 (2013.01); B01L 2300/14 (2013.01); B01L 2300/1805 (2013.01); B01L 2400/049 (2013.01);
(Continued)

(58) Field of Classification Search
CPC .. G01N 1/14; G01N 1/38; G01N 1/44; G01N 23/20; G01N 2223/056; B01L 2200/026; B01L 2200/10; B01L 2200/16; B01L 2300/0681; B01L 2300/14; B01L 2300/1805; B01L 2400/049; B01L 2400/0633
See application file for complete search history.

(56) References Cited

U.S. PATENT DOCUMENTS

| | | |
|---|---|---|
| 3,156,644 A | 11/1964 | Kunin |
| 5,899,567 A | 5/1999 | Morris, Jr. |
| (Continued) | | |

OTHER PUBLICATIONS

Hoang ("Mineral Scales and Deposits: Chapter 3—Mechanisms of Scale Formation and Inhibition," Scientific and Technological Approaches 2015, pp. 47-83). (Year: 2015).*

(Continued)

Primary Examiner — Jill A Warden
Assistant Examiner — Michael Stanley Gzybowski
(74) Attorney, Agent, or Firm — Fish & Richardson P.C.

(57) ABSTRACT

A method for testing salt formation includes heating, by a first heater of an apparatus, an anion solution arranged in a first vessel of the apparatus to a first predetermined temperature and heating, by a second heater of the apparatus, a cation solution arranged in a second vessel of the apparatus to a second predetermined temperature. The method also includes conveying, by a fluid pump of the apparatus, a volume of the anion solution from the first vessel to the second vessel and simultaneously rotating a stirrer arranged in the second vessel to form a mixed solution. The method includes conveying the mixed solution from the second vessel of the apparatus to a sampler of the apparatus.

14 Claims, 2 Drawing Sheets

(52) U.S. Cl.
    CPC    *B01L 2400/0633* (2013.01); *G01N 2223/056* (2013.01)

(56)                References Cited

U.S. PATENT DOCUMENTS 6,692,720  B1    2/2004  Ninane et al.
    2007/0009423 A1  1/2007  Handy et al.

OTHER PUBLICATIONS

Anderko et al. ("Prediction of Mineral Scaling in Oil and Gas Production using a Comprehensive Thermodynamic Model," Corrosion 2010, paper No. 10129, San Antonio, TX, Mar. 14-18, 2010). (Year: 2010).*
Al-Samhan et al., "Evaluating scale deposition and scale tendency of effluent water mix with seawater for compatible injection water," Journal of Petroleum Exploration and Production Technology, Jun. 2020, 10(5):2105-2111.
Kan et al., "Scale Prediction for Oil and Gas Production," SPE Journal, Feb. 2012, 17(2):362-378.
Olajire, "A review of oilfield scale management technology for oil and gas production," Journal of Petroleum Science and Engineering, Nov. 2015, 135:723-737.
thomassci.com [online], "Multi-Position Hot Plate Stirrer,"2022, retrieved Feb. 15, 2022, retrieved from URL <https://www.thomassci.com/Equipment/Hot-Plates/_/Multi-Position-Hot-Plate-Stirrer?q=Multi%20Position%20Hotplate%20Stirrer>, 2 pages.

* cited by examiner

APPARATUS FOR FORMING AND TESTING INORGANIC SALTS

TECHNICAL FIELD

This disclosure relates to a method and apparatus for testing salt formation in fluid mixtures under reservoir conditions.

BACKGROUND

The formation and deposition of inorganic salts can cause formation damage and reduce of oil production from the reservoirs. Inorganic salt (scale) formation can also reduce the integrity of the flow line leading to localized corrosion. Scale forms due to water chemistries from different reservoirs, or wells, experiencing certain operational pressures and temperatures or a change in the composition of a solution. In severe conditions, scale creates a significant restriction, or even a plug, in the production tubing. Scale removal is a common well-intervention operation, with a wide range of mechanical, chemical and scale inhibitor treatment options available.

SUMMARY

In certain aspects, a method includes heating, by a first heater of an apparatus, an anion solution arranged in a first vessel of the apparatus to a first predetermined temperature and heating, by a second heater of the apparatus, a cation solution arranged in a second vessel of the apparatus to a second predetermined temperature. The method also includes conveying, by a fluid pump of the apparatus, a volume of the anion solution from the first vessel to the second vessel and simultaneously rotating a stirrer arranged in the second vessel to form a mixed solution. The method further includes conveying the mixed solution from the second vessel of the apparatus to a sampler of the apparatus.

The mixed solution can include a precipitated salt and a mixed fluid. In some methods also include separating the precipitated salt from the mixed fluid by a filter arranged of the sampler. The filter may be removable from the sampler. In some cases, the method also includes analyzing, by a computer system of the apparatus, properties of the precipitated salt. Some methods also include analyzing, by a computer system of the apparatus, properties of the mixed fluid.

In some embodiments, the method includes analyzing, by a computer system of the apparatus, properties of the mixed solution.

Heating, by the first heater of the apparatus, the anion solution arranged in the first vessel of the apparatus to the first predetermined temperature and heating, by the second heater of the apparatus, the cation solution arranged in the second vessel of the apparatus to the second predetermined temperature, can include rotating a stirrer arranged in the first vessel of the apparatus.

In some methods, heating, by the first heater of the apparatus, the anion solution arranged in the first vessel of the apparatus to the first predetermined temperature and heating, by the second heater of the apparatus, the cation solution arranged in the second vessel of the apparatus to the second predetermined temperature, includes rotating the stirrer arranged in the second vessel of the apparatus.

In some embodiments, conveying the mixed solution from the second vessel of the apparatus to the sampler of the apparatus includes conveying the mixed solution from the second vessel of the apparatus to the sampler of the apparatus by the fluid pump.

In some methods, conveying the mixed solution from the second vessel of the apparatus to the sampler of the apparatus includes drawing the mixed solution from the second vessel of the apparatus to the sampler of the apparatus by a sampling syringe of the sampler.

Some methods also include applying, by a pressurizer of the apparatus, a first pressure to the first vessel and a second pressure to the second vessel. The first pressure and the second pressure can be different pressures or the same pressure. The first pressure and/or second pressure may be about 10 bar to about 50 bar.

In some methods, the first predetermined temperature and/or second predetermined temperature is about 90 C to about 200 C.

In certain aspects, an apparatus includes a first vessel, a second vessel, a first heater, a second heater, a first mixer, a fluid sampler, and a computer system. The first vessel is configured to contain an anion solution. The second vessel is configured to contain a cation solution and is fluidly connected to the first vessel by a mixing fluid line. The first heater is configured to heat the first vessel to a first predetermined temperature. The second heater is configured to heat the second vessel to a second predetermined temperature. The first mixer is arranged in the second vessel. The fluid sampler is fluidly connected to the second vessel by a sample fluid line. The computer system includes a controller and one or more processors, a computer-readable medium storing instructions executable by the one or more processors to perform operations. The operations include prompting, by the controller, the first heater to heat the first vessel to a first predetermined temperature and prompting the second heater to heat the second vessel to the second predetermined temperature. The operations also includes prompting a fluid pump to convey a volume of anion solution in the first vessel to the second vessel by the mixing fluid line and prompting the first mixer to mix the cation solution in the first vessel with the conveyed anion solution to produce a mixed solution, wherein the mixed solution precipitates a salt. The operations further include prompting the sampler to draw the mixed solution from the first vessel by the sampling fluid line.

The sampler can include a filter configured to filter the mixed solution.

The first predetermined temperature and/or second predetermined temperature may be about 90 C to about 200 C.

Some operations also include prompting a valve arranged on the mixing fluid line to open, fluidly connecting the first vessel and the second vessel.

In some apparatuses, the operations include prompting a valve arranged on the sample fluid line to open, fluidly connecting the sampler and the second vessel.

Some apparatuses also have an anion fluid source fluidly connected to the first vessel by a source fluid line to convey, wherein the anion fluid source contains the anion solution. The operations can include prompting a valve arranged on the source fluid line to open, fluidly connecting the anion fluid source and the first vessel.

Some apparatuses also have a pressurizer connected to the first vessel and configured to apply a pressure to the first vessel.

In some apparatuses, a pressurizer connected to the second vessel and configured to apply a pressure to the second vessel.

In some cases, the apparatus, further includes a pressurizer connected to the first and second vessels and configured to apply a first pressure to the first vessel and a second pressure to the second vessel. The first pressure and the second pressure can be different pressures or the same pressure. The first pressure and/or the second pressure can be about 10 bar to about 50 bar.

In certain aspects, a method includes providing a salt formation apparatus. The apparatus includes a first vessel, a second vessel, a first heater, a second heater, a first mixer, and a fluid sampler. The first vessel is fluidly connected to an anion fluid source and is configured to contain an anion solution. The second vessel contains a cation solution and is connected to the first vessel by a mixing fluid line. The first heater is configured to heat the first vessel to a first predetermined temperature. The second heater is configured to heat the second vessel to a second predetermined temperature. The first mixer is arranged in the second vessel. The fluid sampler has a filter configured to filter a mixed solution and is fluidly connected to the second vessel by a sample fluid line. The method further includes prompting, by a controller of the apparatus, the first heater to heat the anion solution in the first vessel to the first predetermined temperature and prompting the second heater to heat the cation solution in the second vessel to the second predetermined temperature. The method also includes prompting a valve arranged on the mixing fluid line to open, fluidly connecting the first vessel and the second vessel, prompting a fluid pump to convey a volume of anion solution in the first vessel to the second vessel by the mixing fluid line, and prompting the first mixer to mix the cation solution in the first vessel with the conveyed anion solution to produce a mixed solution. The mixed solution precipitates a salt. The method also includes prompting the sampler to draw the mixed solution from the first vessel by the sampling fluid line.

Some methods also include prompting a pressurizer connected to the second vessel to apply a predetermined pressure to the cation solution in the second vessel.

In some embodiments, the method includes prompting a pressurizer connected to the first vessel to apply a predetermined pressure to the anion solution in the first vessel.

Some methods include prompting a pressurizer connected to the first and second vessel to apply a first predetermined pressure to the anion solution in the first vessel and apply a second predetermined pressure to the cation solution in the second vessel. The first predetermined pressure and the second predetermined pressure can be different pressures or the same pressure. The first predetermined pressure and/or second predetermined pressure can be about 10 bar to about 50 bar.

In some methods, prompting the sampler to draw the mixed solution from the first vessel by the sampling fluid line includes prompting a sampling syringe of the apparatus to draw the mixed solution through the filter arranged in the sampling syringe.

In some methods, prompting the sampler to draw the solution fluid from the first vessel by the sampling fluid line includes prompting a sampling valve arranged on the sample fluid line to open, fluidly connecting the second vessel to the sampler.

The first predetermined temperature and/or second predetermined temperature can be about 90 C to about 200 C.

The first predetermined temperature and the second predetermined temperature can be different temperatures or the same temperature.

In some methods, prompting, by the controller of the apparatus, the first heater to heat the anion solution in the first vessel to the predetermined temperature and prompting the second heater to heat the cation solution in the second vessel to the second predetermined temperature, includes prompting a second mixer arranged in the first vessel to mix the anion solution in the first vessel.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

The disclosed apparatus and methods form inorganic salts under reservoir conditions. The quantity, compositions, and speed of formation can be analyzed by the apparatus or by a separate analysis machine. The apparatus includes a first vessel, a second vessel a mixing fluid line connecting the first and second vessels, a sampler, and a sample fluid line connecting the second vessel to the sampler. The apparatus also includes heaters for preheating the liquids in the first and second vessels to known temperatures and a mixer (e.g., a stirrer, stir bar, mixing paddle, mixing arm, scraper arm, or scraper paddle) in the second vessel for mixing fluids together to form a mixed solution in which inorganic salt may precipitate. In use the apparatus prepares the fluids in the vessels to simulate reservoir conditions. For example, the first heater heats an anionic solution in the first vessel to a known temperature and heats the second cationic solution in the section vessel to a known temperature. The mixer in the second vessel can be activated to mix the cation solution. The anionic solution flows from the first vessel to the second vessel and the mixer agitates the cation solution to mix the cation solution with the incoming anion solution. The combination of heated anion solution and heated cation solution forms a mixed solution with a fluid components and a salt component. The salt is representative of a salt that would form under the same conditions in a reservoir, well, or in fluid piping. The sampler then draws the mixed solution and separates the salt component from the fluid components. Each of the salt components and the fluid components may be analyzed by the apparatus and/or may be transported to an analysis machine. Analysis can include counting the chemical species in the salt components and/or fluid components using an ionized analyzer.

The apparatus and methods reduce super-saturation around the mixing point where the anion solution initially enters the cation solution. Further, the apparatus and methods described herein can increase accuracy by preparing the anion and cation solutions to reservoir temperatures and pressure prior to mixing. The preheating of the solutions can prevent the formation of undesired salts that form in lower (non-reservoir condition) temperature ranges. In addition, the apparatus and methods described herein can quickly test water compatibility, chemical compatibility, and scale inhibitors under reservoir conditions, thereby reducing the likelihood of plugs and scale during well operations.

Figure 1:
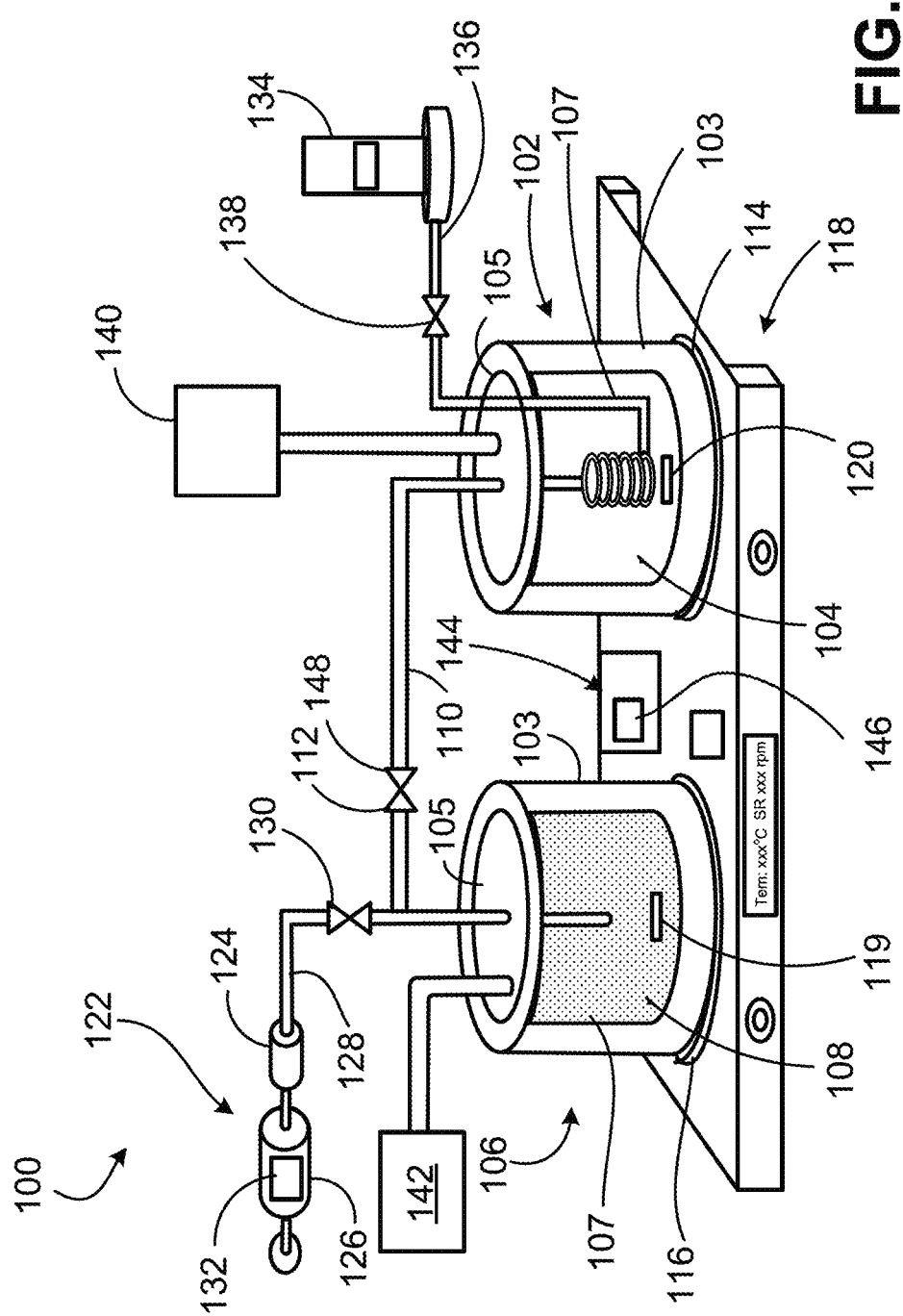
FIG. 1 is a perspective view of an apparatus for forming inorganic salts under reservoir conditions.

FIG. 1 is a perspective view of an apparatus 100 for forming inorganic salts under reservoir conditions. The apparatus 100 includes a first vessel 102 configured to contain an anion solution 104 and a second vessel 106 configured to contain a cation solution 108. The first vessel 102 and second vessel 106 each have walls 103 and a lid 105 that define an interior volume 107. The lids 105 are removable to access the interior volume 107 of the vessels 102, 106. The second vessel 106 is fluidly connected to the first vessel 102 by a mixing fluid line 110. A first (mixing) valve 112 is arranged on the mixing fluid line 110. In the open position of the first valve 112, the first vessel 102 and the second vessel 106 are fluidly connected by the mixing fluid line 110. In the closed position, the first valve 112 prevents fluid connection between the first vessel 102 and the second vessel 106. The first valve may be a manual valve or an electronic valve controlled by a computer system of the apparatus. The first and second vessels may be made of a heat resistant material, for example glass. In some cases, the vessels and fluid lines are made of a pressure resistant material configured to maintain a pressure. The first valve can include a flow meter operable to measure the volume of anionic solution flowing to the second vessel. In some apparatuses, a flow meter is mounted on the mixing fluid line and is configured to measure the volume of anionic solution flowing to the second vessel. The anion solution and cation solution may have a combine volume of 100 milliliters (mL), 200 mL, 300 mL, 400 mL, 500 mL, 600 mL, 700 mL, 800 mL, 900 mL, 1 liter (L) 1.5 L, 2 L, 2.5 L, 3 L 3.5 L, 4 L, 4.5 L, or 5 L.

The apparatus 100 also includes a first heater 114 and a second heater 116. The first heater 114 is arranged on a vessel holder 118 so that the first vessel 102, when place on the vessel holder 118, contacts the first heater 114. The first heater 114 is configured to heat the first vessel 102 to a first predetermined temperature. The first predetermined temperature is chosen to simulate reservoir, well, or transport pipe conditions. The first predetermined temperature may be about 20° C. to about 250° C., for example between about 20° C. to about 250° C., about 50° C. to about 200° C., about 50° C. to about 175° C., about 50° C. to about 150° C., about 50° C. to about 125° C., about 75° C. to about 200° C., about 75° C. to about 175° C., about 75° C. to about 150° C., about 75° C. to about 125° C., about 90° C. to about 200° C., about 90° C. to about 175° C., about 90° C. to about 150° C., about 90° C. to about 125° C., about 100° C. to about 250° C., about 100° C. to about 200° C., about 100° C. to about 175° C., about 100° C. to about 150° C., about 100° C. to about 125° C., about 125° C. to about 250° C., about 125° C. to about 200° C., about 125° C. to about 175° C., about 125° C. to about 150° C., about 150° C. to about 250° C., about 150° C. to about 200° C., about 150° C. to about 175° C., about 175° C. to about 250° C., about 175° C. to about 200° C., about 200° C. to about 250° C. In some apparatuses, the first heater is a heating coil. The first heater may be a manually controlled or may be electronically controlled by a computer system of the apparatus.

The second heater 116 is arranged on a vessel holder 118 so that the second vessel 106, when place on the vessel holder 118, contacts the second heater 116. The second heater 116 is configured to heat the second vessel 106 to a second predetermined temperature. The second predetermined temperature is chosen to simulate reservoir, well, or transport pipe conditions. The second predetermined temperature may be about 20° C. to about 250° C., for example between about 20° C. to about 250° C., about 50° C. to about 200° C., about 50° C. to about 175° C., about 50° C. to about 150° C., about 50° C. to about 125° C., about 75° C. to about 200° C., about 75° C. to about 175° C., about 75° C. to about 150° C., about 75° C. to about 125° C., about 90° C. to about 200° C., about 90° C. to about 175° C., about 90° C. to about 150° C., about 90° C. to about 125° C., about 100° C. to about 250° C., about 100° C. to about 200° C., about 100° C. to about 175° C., about 100° C. to about 150° C., about 100° C. to about 125° C., about 125° C. to about 250° C., about 125° C. to about 200° C., about 125° C. to about 175° C., about 125° C. to about 150° C., about 150° C. to about 250° C., about 150° C. to about 200° C., about 150° C. to about 175° C., about 175° C. to about 250° C., about 175° C. to about 200° C., about 200° C. to about 250° C. The first and second predetermined temperatures may be the same temperature or may be different temperatures. In some apparatuses, the second heater is a heating coil. The second heater may be a manually controlled or may be electronically controlled by a computer system of the apparatus.

The apparatus 100 has a cation (first) mixer with a stirrer 119 arranged in the interior volume 107 of the second vessel 106. The stirrer 119 is a magnetic stir bar is configured to rotate upon the rotation of a magnet (not shown) of the cation mixer. The magnet (not shown) is arranged in the vessel holder 118. Some stirrers are mixing paddles, mixing arms, or scraper arms with or in place of the magnetic stir bar. Some mixers include motors that are mechanically connected to the stirrer to rotate the stirrer. Some mixers vibrate or move the entire vessel to agitate the fluid in the interior volume of the second vessel. The first mixer is configured to mix, stir, and/or agitate the anion fluid 104 contained in the second vessel 106. The cation mixer is activated or actuated when the second heater 116 heats the cation solution 108 in the second vessel 106 and/or while the anion fluid 104 is conveyed into the second vessel 106.

The apparatus 100 has an anion (second) mixer with a stirrer 119 arranged in the interior volume 107 of the first vessel 102. The stirrer 119 is a magnetic stir bar is configured to rotate upon the rotation of a magnet (not shown) of the anion mixer. The magnet (not shown) is arranged in the vessel holder 118. Some stirrers are mixing paddles, mixing arms, or scraper arms with or in place of the magnetic stir bar. Some mixers include motors that are mechanically connected to the stirrer to rotate the stirrer. Some mixers vibrate or move the entire vessel to agitate the fluid in the interior volume of the first vessel. The anion mixer is configured to mix, stir, and/or agitate the anion fluid 104 contained in the first vessel 102. The anion mixer is activated or actuated when the first heater 114 heats the anion solution 104 in the first vessel 102. In some apparatuses, the anion mixer is not present.

The apparatus 100 also includes a sampler 122 having a filter 124 and a fluid syringe 126. The sampler 122 is fluidly connected to the second vessel 106 by a sample fluid line 128. A second (sample) valve 130 is disposed on the sample fluid line 128 to control the flow of fluid from the second vessel 106 to the sampler 122. In the open position of the second valve 130, the sampler 122 and the second vessel 106 are fluidly connected by the sample fluid line 128. In the closed position, the second valve 130 prevents fluid connection between the sampler 122 and the second vessel 106. The second valve may be a manual valve or an electronic valve controlled by a computer system of the apparatus. The filter 124 is arranged upstream of the fluid syringe 126 so that the fluid flowing from the second vessel 106 to the sampler 122 is filtered of solids (e.g., salts). The filter 124 is removable from the sampler 122. The filter can be made of polymer, fiber glass, nylon filter, silica paper, or a combination thereof. The filter may have a minimum mesh size of about 50 microns and may have a maximum mesh size of about 1 millimeter. The fluid syringe 126 is configured to draw or convey fluid from the second vessel 106 to the sampler 122 when the second valve 130 is in the open position. The fluid syringe also includes a reservoir 132 for holding the drawn fluid. The fluid syringe may be a manual syringe with a piston that can be pulled by an operator. Some fluid syringes are electronically controlled by a computer system of the apparatus. Some samplers include a fluid pump and fluid receptacle rather than a fluid syringe. In such a case, the filter is arranged upstream of the fluid receptacle and the fluid pump is configured to convey fluid from the second vessel to the fluid receptacle. The strained or filter fluid may be used for additional analysis. In some cases, the sampler does not include a filter and the unfiltered fluid from the second vessel is analyzed.

The apparatus 100 has an anion fluid source 134 fluidly connected to the first vessel 102 by a source fluid line 136. A third (source) valve 138 is arranged on or disposed in the source fluid line 136. In the open position of the third valve 138, the first vessel 102 and the fluid source 134 are fluidly connected by the source fluid line 136. In the closed position, the third valve 138 prevents fluid connection between the first vessel 102 and the fluid source 134. The third valve may be a manual valve or an electronic valve controlled by a computer system of the apparatus. The fluid source may be a syringe pump that can be manually or electronically actuated to flow anionic fluid from the fluid source to the first vessel. Some fluid sources are fluid reservoirs with a fluid pump operable to convey fluid form the reservoir to the first vessel.

The apparatus also includes a first pressurizer 140 and a second pressurizer 142. The first and second pressurizers may be or include autoclaves configured to apply pressures to the first and/or second vessels. The first pressurizer is connected to the first vessel 102 and is operable to control the pressure in the interior volume 107 of the first vessel 102. The second pressurized 142 is connected to the second vessel 106 and is operable to control the pressure in the interior volume 107 of the second vessel 106. In some apparatuses, a single pressurizer is connected to both the first and second vessels and is configured to control the pressures in the first and second vessels. The single pressurizer may apply different pressures to the first and second vessels. The first pressurizer 140 is configured to apply a first (predetermined) pressure to the interior volume 107 of the first vessel 102. The first predetermined pressure is representative of reservoir conditions. The first predetermined pressure may be about 10 bar to about 50 bar. In some apparatuses, the first predetermined pressure is about 1 bar to about 75, about 15 to about 45, about 20 to about 30, or about 10 to about 40, for example, about 1 bar, about 5 bar, about 10 bar, about 15 bar, about 20 bar, about 25 bar, about 30 bar, about 35 bar, about 40 bar , about 45 bar, about 50 bar, about 55 bar, about 60 bar, about 65 bar, about 70 bar, or about 75 bar.

The second pressurizer 142 is configured to apply a second predetermined pressure to the interior volume 107 of the second vessel 106. The second predetermined pressure is representative of reservoir conditions. The second pressurizer 142 is configured to apply a second (predetermined) pressure to the interior volume 107 of the second vessel 106. The second predetermined pressure may be about 10 bar to about 50 bar. In some apparatuses, the second predetermined pressure is about 1 bar to about 75, about 15 to about 45, about 20 to about 30, or about 10 to about 40, for example, about 1 bar, about 5 bar, about 10 bar, about 15 bar, about 20 bar, about 25 bar, about 30 bar, about 35 bar, about 40 bar , about 45 bar, about 50 bar, about 55 bar, about 60 bar, about 65 bar, about 70 bar, or about 75. The mixing fluid line 110 is able to maintain the pressure of the first and/or second pressurizers 140, 142. When the first valve 112 is closed, the first valve 112 is configured to seal the mixing fluid line 110 so that the first predetermined pressure is maintained in the first vessel 102 and the second determined pressure is maintained in the second vessel 106. The difference between the first predetermined pressure and the second predetermined pressure is less than about 10 bar, for example, less than about 5 bar, less than about 4 bar, less than about 3 bar, less than about 2 bar, less than about 1 bar, or less than about 0.5 bar.

The first vessel 102 is configured to hold an anionic solution for example, a sulfate solution or a carbonate solution. A sulfate solution may be or contain an $SO_4^{2-}$ solution or an $SO_3^{2-}$ solution. The carbonate solution may be or contain a $CO_3^{2-}$ solution or a $Cl^-$ solution. The second vessel 106 is configured to hold a cationic solution, for example, a calcium ($Ca^{2+}$) solution, a barium ($Ba^{2+}$) solution, an iron ($Fe^{2+}$) solution, or a sodium ($Na^+$) solution. The anionic solution and cationic solution are mixed together in the second vessel 106 to form a mixed solution. The mixed solution has a precipitated salt component and a mixed fluid component. When the cationic solution and anionic solution are mixed, there are multiple types of salt that can be formed based on the temperature (and/or pressure) of the solutions at the time of mixing. The solutions are preheated to simulated reservoir temperatures and conditions by the first and second heater so that the salt formed by the solutions is representative of the salt that would be formed in the reservoir. The solutions can also be pre-pressurized by the first and second pressurizers 140, 142 so that the salt formed by the solutions is representative of the salt that would be formed in the reservoir.

The salt component and/or the fluid component can be analyzed or tested by an analyzer (not shown) attached to the sampler. In some cases, the analyzer is integral with the sampler. In some cases, the analyzer is part of the computer sub-system. The analyzer can include an x-ray diffraction device and/or a mass spectrometer (e.g., a miniature mass spectrometer or a standard mass spectrometer).

The apparatus 100 has a computer system 144 operable to control the first valve 112, the second valve 130, the third valve 138, the first heater 114, the second heater 116, the first mixer, the second mixer, the first pressurizer 140, the second pressurizer 142, the sampler 122, and/or the anionic fluid source 134. The computer system 144 has a controller 146, one or more processors, and a computer-readable medium storing instructions executable by the one or more processors to perform operations. The computer system 144 is arranged in the vessel holder 118, however, some computer systems may be arranged in a computer system housing.

The operations include prompting, by the controller 146, the third valve 138 arranged on the source fluid line 136 to open, fluidly connecting the anion fluid source 134 and the first vessel 102. The operations further include, prompting, by the controller 146, the first heater 114 to heat the first vessel 102 to the first predetermined temperature and prompting the second heater 116 to heat the second vessel 106 to the second predetermined temperature. The operations also include prompting, by the controller 146, the first mixer arranged in the second vessel 106 to mix the cation solution 108 in the section vessel 106 and the second mixer arranged in the first vessel 102 to mix the anion solution 104 in the first vessel 102.

The operations also include the prompting, by the controller 146, the first valve 112 arranged on the mixing fluid line 110 to open, fluidly connecting the first vessel 102 and the second vessel 106 and prompting, by the controller 146, the first and second heater 114, 116 to heat the anion solution 104 in the first vessel 102 and the cation solution 108 in the second vessel 106 to the first and second predetermined temperatures, respectively. A temperature sensor arranged in each of the first and second vessels may confirm (and transmit the confirmation to the controller) that the first and second predetermined temperatures have been reached. The operations can also prompting, by the controller, a (first) pressurizer connected to the first vessel to apply a first predetermined pressure to the anion solution in the first vessel. In some apparatuses, the operations can include prompting, by the controller, a (second) pressurizer connected to the second vessel to apply a second predetermined pressure to the cation solution in the second vessel. The first predetermined pressure and the second predetermined pressure may be the same or different pressures. The first predetermined pressure is about 10 bar to about 50 bar and the second predetermined pressure is about 10 to about 50 bar.

The operations also includes, prompting, by the controller 146, the fluid pump or fluid source 134 to convey a volume of the anion solution in the first vessel 102 to the second vessel 106 by the mixing fluid line 110. The fluid source may over fill the first vessel so that an overflow volume passes through the mixing fluid line. In some cases, the fluid in the first fluid source is heated to the first predetermined temperature, for example by a helicoid heater or a hot plate. The operations further include, prompting, by the controller 146 the first mixer to mix the cation solution 108 in the second vessel 106 with the conveyed anion solution 104 to produce a mixed solution. The mixed solution precipitates a salt.

The operations further include prompting, by the controller 146, the second valve 130 arranged on the sample fluid line 128 to open, fluidly connecting the second vessel 106 to the sampler 122. The operations include prompting, by the controller 146, the second valve 130 arranged on the sample fluid line 128 to open, fluidly connecting the sampler 122 and the second vessel 106, and prompting, by the controller 146, the sampler to draw the mixed fluid from the first vessel by the sampling fluid line. Some operations include, prompting, by the controller, the sampling syringe of the apparatus to draw the mixed solution through the filter arranged in the sampling syringe. The operations can also include prompting an analyzer attached to or integral with the sampler to analyze the mixed solution, the salt component, or the mixed fluid.

Figure 2:
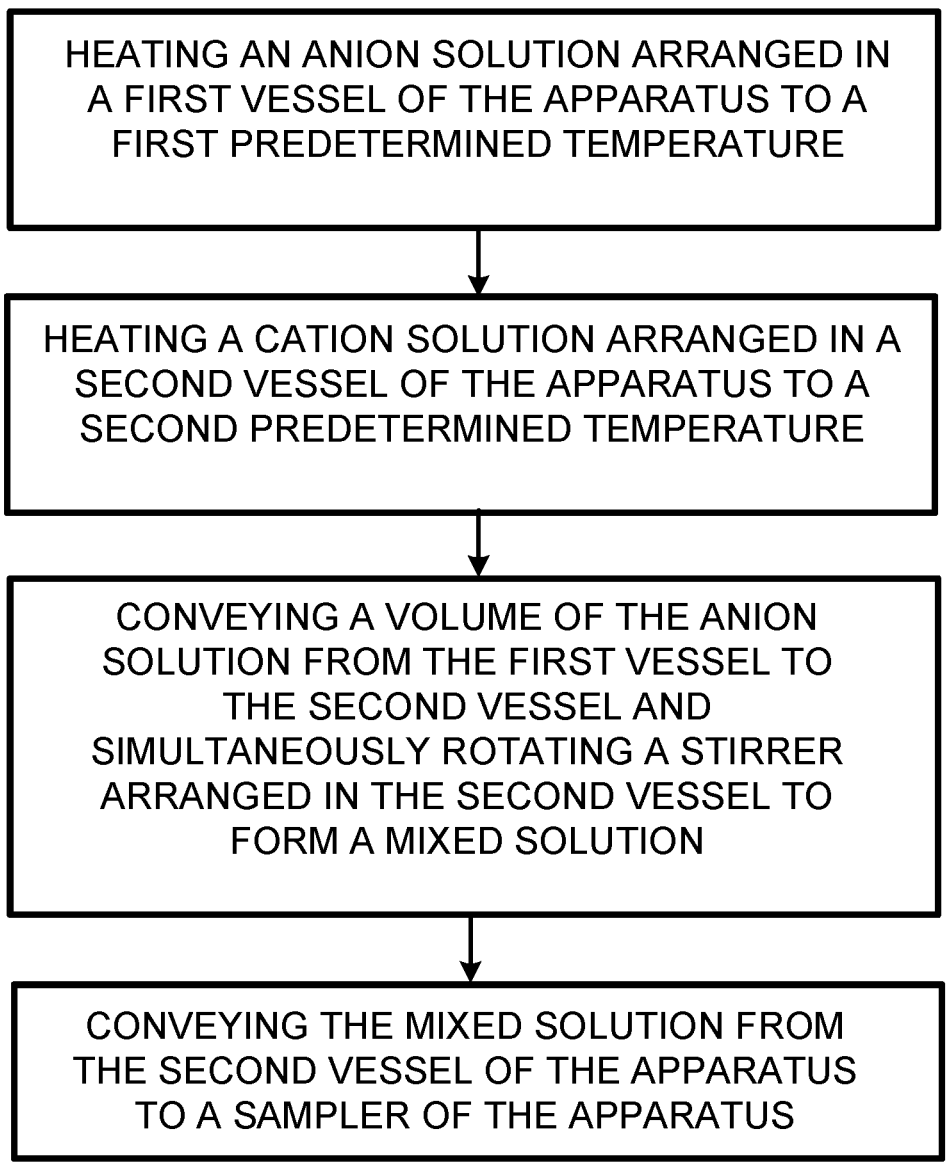
FIG. 2 is a flow chart of a method for operating a salt formation apparatus.

FIG. 2 is a flow chart of a method 200 for operating a salt formation apparatus. The method 200 is described with reference to the apparatus 100, however, the method 200 may be used with other applicable apparatuses.

The apparatus 100 is provided in an initial state in which the first, second, and third valves 112, 130, 138 are closed and the first and second pressurizers 140, 142 are off or apply 1 atmosphere. The first and second pressurizers may be or include autoclaves configured to apply pressures to the first and/or second vessels. The interior volumes 107 of the first and second vessels 102, 106 are empty. The piston of the fluid syringe 126 of the sampler is fully inserted into the fluid reservoir 132 and the anion fluid source 134 contains anion solution. The first and second heaters 114, 116 and the first and second mixers are also off or deactivated.

The method 200 includes preparing the apparatus for use by loading the vessels with an anion and a cation solution. The lid 105 of the second vessel 106 is removed and a volume of a cation solution 108 is inserted into interior volume 107 of the second vessel 106. The third valve 138 on the source fluid line 136 is opened and the anion fluid source 134 conveys a volume of anion solution 104 into the first vessel 102. In some systems, a flow meter is arranged on the source fluid line 136 to measure the volume of anion solution 104 inserted into the first vessel 102. The third valve 138 is closed and the lid 105 of the second vessel 106 is replaced to close the second vessel 106. The third valve, flow meter, and anion fluid source can be operable to be controlled and/or prompted by the computer system (e.g., the controller of the computer system).

The reservoir conditions are chosen or inputted by an operator. In some cases, the reservoir conditions are pre-loaded into a memory of the computer system. The reservoir conditions dictate the predetermined temperatures and/or predetermined pressures applied to the anion and cation solutions 104, 108. The first and second heaters 114, 116 are activated and the anion fluid 104 in the first vessel 102 is heated to the first predetermined temperature. The first pressurizer can also be activated to pressurize the first vessel to the first predetermined pressure. The cation solution 108 is heated by the second heater 116 to the second predetermined temperature. The second pressurizer can also be activated to pressurize the second vessel to the second predetermined pressure. To uniformly distribute the heat from the first and second heaters 114, 116, the first and second mixer are also activated to agitate the cation solution 108 and anion solution 104. The first and second stirrers 119, 120 of the first and second mixers rotate to mix the solutions 104, 108. The first heater, second heater, first pressurizer, second pressurizer, first mixer, and second mixer can be operable to be controlled and/or prompted by the computer system (e.g., the controller of the computer system).

The first valve 112 is opened to fluidly connect the first vessel 102 to the second vessel 106. The method 200 includes conveying, by a fluid pump 148 (FIG. 1) of the apparatus 100, a volume of the preheated (and/or pre-pressurized) anion solution 104 from the first vessel 102 to the second vessel and simultaneously rotating the stirrer 119 of the first mixer arranged in the second vessel to form a mixed solution. A flow meter arranged on the mixing fluid line may measure the amount of volume of preheated anion solution 104 flowing through the mixing fluid line into the second vessel. The anion solution 104 and the cation solution 108 combine to form a mixed solution. The mixed solution contains a precipitated salt and a (mixed) fluid. In some cases, the mixed solution does not precipitate a salt under the reservoir conditions. The first mixer continues to agitate the mixed solution for a duration of time. The duration of time may be 20 seconds, 45 seconds, 1 minute, 5 minutes, 10 minutes, 20 minutes, 30 minutes, 45 minutes, 1 hour, 2 hours, 5 hours, 8 hours, 12 hours, 16 hours, 20 hours, 24 hours, 36 hours, 48 hours, 3 days, 4 days, 5 days, 6 days, or 1 week. The second heater may be prompted (by the controller of the computer system) to heat the mixed solution to a third temperature as the stirrer agitates the mixed solution. The third temperature may be the same temperature as the second predetermined temperature, or different from the second predetermined temperature. The first valve 112, fluid pump 148, first mixer, second heater, and flow meters can be operable to be controlled and/or prompted by the computer system (e.g., the controller of the computer system).

The method 200 also includes opening the second valve 130 to fluidly connect the second vessel 106 to the sampler 122. The fluid syringe 126 of the sampler 122 draws or conveys the mixed solution from the second vessel 106 via the sample fluid line 128. Some samplers convey the mixed solution by a fluid pump of the apparatus. The filter 124 of the sampler 122 separates the precipitated salt of the mixed solution from the mixed fluid of the mixed solution. The mixed fluid continues to be drawn into the reservoir 132 of the sample syringe 126 as the filter 124 retains the salt and becomes increasingly saturated by the salt. The sampler 122 stops drawing fluid when the filter 124 is saturated at about 10% to about 90%. In some cases, the sampler stops drawing fluid when the filter is saturated at about 0.1% to about 100%, for example, about 1% to about 99%, about 10% to about 99%, about 20% to about 90%, about 30% to about 85%, about 40% to about 80%, about 40% to about 75%, about 45% to about 99%, about 50% to about 90%, about 50% to about 80%, about 50% to about 99%, about 60% to about 90%, about 75% to about 99%, about 80% to about 99%, about 10%, about 20%, about 25%, about 30%, about 40%, about 50%, about 60%, about 70%, about 75%, about 80%, about 90%, or about 99% saturation. In some cases, the sampler stops drawing fluid from the second vessel after a duration of time has expired.

The method 200 further includes analyzing, by the computer system of the apparatus or an analyzer of the apparatus, properties of the mixed solution, the precipitated salt, and/or the mixed fluid. The computer system and/or analyzer can include an x-ray diffraction device, x-ray spectroscopy device, and/or a mass spectrometer. The apparatus may perform x-ray diffraction (XRD) characterization tests on the salts deposited in the filters. The apparatus may also determine the composition of liquids of the mixed fluid and chemical formulas of compounds (e.g., salts) in the filter. The tests can determine or suggest water incompatibilities and/or chemical treatment efficiency.

While an apparatus with a second mixer has been described, some apparatuses have a single mixer arranged to align with the second vessel. For example the single mixer may include a stirrer arranged in the interior space of the second vessel and/or a vibrational unit arranged in the vessel holder 118 aligned with the second vessel.

Some vessel holders have a first recess sized to receive the first vessel and a second recess sized to receive the second vessel.

While the apparatus has been described containing the cation solution in the second vessel and the anion solution in the first vessel, some apparatuses include a cation fluid source rather and an anion fluid source, hold the cation solution in the first vessel, and hold the anion solution in the second vessel. In such a configuration, the cation solution is preheated and conveyed into the second vessel to mix with the anion solution in the second vessel. The anion solution may be loaded into the second vessel by removing the lid of the second vessel and inserting the volume of anion solution into the interior volume of the second vessel.

While the apparatus has been described containing the cation solution in the second vessel and the anion solution in the first vessel, some apparatuses include a first water sample water sample in the first vessel and a second water sample in the second vessel. In such a configuration, the first and second water sample are pressurized and heated to known pressures and temperatures that mimic reservoir conditions. In some cases, additives, for example salts, ion solutions, and/or scale inhibitors, are added to the first water sample and/or second water sample. The first water sample flows into the second vessel and is mixed to form a mixed solution. The mixed solution is drawn into the sampler and tested by the computer system.

The first water sample may be taken from a first well and the second water sample may be taken from a second well. The first water sample and the second water sample may be taken from the first well. The first water sample may be taken from the first well and the second water sample may be taken from a drilling fluid. The first water sample may be taken from the first well and the second water sample may be taken from a water source (e.g., seawater, tap water, potable water, or waste water).

A number of embodiments have been described. Nevertheless, it will be understood that various modifications may be made without departing from the spirit and scope. Accordingly, other embodiments are within the scope of the following claims.

What is claimed is:

1. An apparatus comprising:
a first vessel configured to contain an anion solution,
a second vessel configured to contain a cation solution, the second vessel fluidly connected to the first vessel by a mixing fluid line,
a first heater connected to the first vessel, the first heater configured to heat the first vessel to a first predetermined temperature,
a fluid pump connected to the mixing fluid line;
a second heater connected to the second vessel, the second heater configured to heat the second vessel to a second predetermined temperature,
a first mixer arranged in the second vessel,
a fluid sampler fluidly connected to the second vessel by a sample fluid line, and
a computer sub-system comprising:
a controller; and
one or more processors, a computer-readable medium storing instructions executable by the one or more processors to perform operations, the operations comprising:
prompting, by the controller, the first heater to heat the first vessel to a first predetermined temperature and prompting the second heater to heat the second vessel to the second predetermined temperature,
prompting the fluid pump to convey a volume of anion solution from the first vessel to the second vessel by the mixing fluid line,
prompting the first mixer to mix the cation solution in the second vessel with the conveyed anion solution from the first vessel to produce a mixed solution, wherein the mixed solution precipitates a salt, and
prompting the fluid sampler to draw the mixed solution from the second vessel by the sample fluid line.

2. The apparatus of claim 1, further comprising a removable filter arranged in the sample fluid line or in the fluid sampler, wherein the filter has a mesh of amount 50 microns to about 1 millimeter.

3. The apparatus of claim 1, wherein the first vessel is made of a material that is heat resistant, wherein the material is configured to withstand the first predetermined temperature of about 90° C. to about 200° C.

4. The apparatus of claim 1, wherein the second vessel is made of a material that is heat resistant, wherein the material is configured to withstand the second predetermined temperature of about 90° C. to about 200° C.

5. The apparatus of claim 1, further comprising a valve arranged on the mixing fluid line, wherein in an open position, the valve fluidly connects the first vessel and the second vessel.

6. The apparatus of claim 1, further comprising a valve arranged on the sample fluid line and operably connected to the computer sub-system, wherein in an open position, the valve fluidly connects the sampler to the second vessel.

7. The apparatus of claim 1, further comprising a pressurizer connected to an interior volume of the second vessel and configured to apply a pressure to the interior volume of the second vessel.

8. The apparatus of claim 1, wherein the fluid sampler further comprises an analyzer operably connected to the computer sub-system, wherein the analyzer comprises at least one of:

an x-ray diffraction device, an x-ray spectroscopy device, and a mass spectrometer.

9. The apparatus of claim 1, further comprising an anion fluid source fluidly connected to the first vessel by a source fluid line, wherein the anion fluid source contains the anion solution.

10. The apparatus of claim 9, further comprising a valve arranged on the source fluid line and operably connected to the computer sub-system, wherein in an open position, the valve fluidly connects the anion fluid source to the first vessel.

11. The apparatus of claim 1, further comprising a pressurizer connected to an interior volume of the first vessel and configured to apply a pressure of about 10 bar to about 50 bar to the interior volume of the first vessel, wherein the first vessel is made of a material that is pressure resistant.

12. The apparatus of claim 11, further comprising a second pressurizer connected to a second interior volume of the second vessel and configured to apply a second pressure of about 10 bar to about 50 bar to the second interior volume of the second vessel, wherein the second vessel is made of a material that is pressure resistant.

13. The apparatus of claim 12, further comprising a sealing valve disposed on the mixing fluid line and operable to maintain a pressure differential between the first vessel and the second vessel.

14. The apparatus of claim 12, wherein the first vessel comprises a first removable lid, and the second vessel comprise a second removable lid, wherein the mixing fluid line extends between the first removable lid and the second removable lid and into the first vessel and second vessel.

* * * * *